(12) United States Patent
Seo

(10) Patent No.: US 8,928,821 B2
(45) Date of Patent: Jan. 6, 2015

(54) TV AND AUDIO PROCESSING METHOD THEREOF

(75) Inventor: Jae-hong Seo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 359 days.

(21) Appl. No.: 12/859,956

(22) Filed: Aug. 20, 2010

(65) Prior Publication Data

US 2011/0122318 A1    May 26, 2011

(30) Foreign Application Priority Data

Nov. 26, 2009  (KR) .................... 10-2009-0115259

(51) Int. Cl.
| | |
|---|---|
| H04N 5/60 | (2006.01) |
| H04N 5/445 | (2011.01) |
| H04N 5/76 | (2006.01) |
| H04N 5/93 | (2006.01) |
| H04N 5/94 | (2006.01) |
| H04N 9/88 | (2006.01) |
| G06F 3/048 | (2013.01) |
| H04N 5/44 | (2011.01) |
| H04N 21/485 | (2011.01) |

(52) U.S. Cl.
CPC ............. *H04N 5/445* (2013.01); *H04N 5/4403* (2013.01); *H04N 21/4852* (2013.01)

USPC ........... 348/738; 348/563; 386/296; 386/353; 386/263; 715/822

(58) Field of Classification Search
None
See application file for complete search history.

(56) References Cited

U.S. PATENT DOCUMENTS

| | | | | |
|---|---|---|---|---|
| 5,903,701 | A  * | 5/1999 | Lydecker et al. | 386/263 |
| 2008/0005696 | A1 * | 1/2008 | Shivaji-Rao | 715/822 |
| 2009/0052868 | A1 * | 2/2009 | Furutani | 386/96 |
| 2009/0060455 | A1 * | 3/2009 | Pan et al. | 386/96 |
| 2010/0073562 | A1 * | 3/2010 | Miyoshi | 348/563 |
| 2010/0188586 | A1 * | 7/2010 | Tsubouchi | 348/738 |

OTHER PUBLICATIONS

Extended European Search Report issued on Mar. 29, 2011 in counterpart European Application No. 10189445.9.
Communication dated Feb. 8, 2013 issued by the European Patent Office in counterpart European Application No. 10189445.9.

* cited by examiner

*Primary Examiner* — Jefferey Harold
*Assistant Examiner* — Sean Haiem
(74) *Attorney, Agent, or Firm* — Sughrue Mion, PLLC

(57) ABSTRACT

A television (TV) includes an audio signal processing unit which processes a audio signal, a display unit which displays an audio quality setting state, a determination unit which determines if an event for checking audio quality has occurred, and a control unit which controls the display unit to display an audio quality setting state showing improved audio quality if the event has occurred.

21 Claims, 6 Drawing Sheets

TV AND AUDIO PROCESSING METHOD THEREOF

CROSS-REFERENCE TO RELATED APPLICATIONS

This application claims priority from Korean Patent Application No. 10-2009-0115259, filed on Nov. 26, 2009 in the Korean Intellectual Property Office, the disclosure of which is incorporated herein by reference in its entirety.

BACKGROUND

1. Field

Apparatuses and methods consistent with exemplary embodiments relate to a television (TV) and an audio processing method thereof, and more particularly, to a TV capable of visually showing enhanced audio performance, and an audio processing method thereof.

2. Description of the Related Art

Recently, in the electronic device industry, many different devices have been introduced with rapid technical development. In the TV industry, manufacturers release numerous types of TVs, so consumers have difficulty selecting a desired TV.

In the TV industry, image quality, audio quality, and design are key elements that consumers evaluate to select a TV.

In the case of image quality of a TV, a demonstration screen displays an area having an enhanced image quality and an area having a non-enhanced image quality, so that consumers can evaluate differences in image quality.

Consumers can evaluate an external appearance simply by viewing the TV.

However, the only way a consumer can evaluate audio quality is to listen to the enhanced audio, but it is difficult for consumers to recognize enhanced audio quality using only the auditory element.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a TV capable of visually showing enhanced audio performance and an audio processing method thereof.

According to an aspect of an exemplary embodiment, there is provided an audio processing method of a TV, including determining if an event for checking an audio quality has occurred, and displaying an audio quality setting state corresponding to an improved audio quality if the event occurs.

The audio processing method may further include playing back the received audio signal of the received broadcast signal if the event has occurred, performing an audio quality improvement operation for the received audio signal to generate an improved audio signal having the improved audio quality, and playing back the improved audio signal.

The audio quality setting state corresponding to the improved audio quality may be displayed when the improved audio signal is being played back.

The audio processing method may further include repeatedly playing back the received audio signal and the improved audio signal a preset number of times.

The repeatedly playing back may include repeatedly playing back a plurality of different received audio signals and respective improved audio signals a respective number of times that is preset for each audio signal.

The audio processing method may further include displaying a user interface (UI) inquiring whether to change the audio quality setting state showing the improved audio quality.

The event may occur when a preset period of time has elapsed, a user command is input, or the broadcast signal is received.

The audio processing method may further include displaying a UI inquiring whether to check the audio quality if the event has occurred.

The audio processing method may further include playing back the received audio signal of the received broadcast signal when the broadcast signal is received, identifying a type of the received broadcast signal, performing an audio quality improvement operation corresponding to the identified type to generate an improved audio signal having the improved audio quality, and playing back the improved audio signal.

The audio quality setting state corresponding to the improved audio quality may be displayed when the improved audio signal is being played back.

The broadcast signal may further include broadcast information including an electronic program guide (EPG), and the type of the received broadcast signal may be identified using a schedule of broadcast channels contained in the EPG.

According to an aspect of another exemplary embodiment, there is provided a TV including an audio signal processing unit which processes the received audio signal of the received broadcast signal, a display unit which displays an audio quality setting state, a determination unit which determines if an event for checking an audio quality has occurred, and a control unit which controls the display unit to display the audio quality setting state corresponding to an improved audio quality if the event has occurred.

The audio signal processing unit may play back the received audio signal of the received broadcast signal if the event has occurred, perform an audio quality improvement operation for the received audio signal to generate an improved audio signal, and play back the improved audio signal.

The control unit may control the display unit to display the audio quality setting state showing the improved audio quality when the audio signal having the improved audio quality is being played back.

The audio signal processing unit may repeatedly play back the received audio signal and the improved audio signal a preset number of times.

The audio signal processing unit may repeatedly play back each of a plurality of different received audio signals and respective improved audio signals a respective number of times that is preset for each audio signal.

The display unit may display a UI inquiring whether to change the audio quality setting state showing the improved audio quality.

The event may occur when a preset period of time has elapsed, a user command is input, or the broadcast signal is received.

The display unit may display a UI inquiring whether to check the audio quality if the event has occurred.

The audio signal processing unit may play back the received audio signal of the received broadcast signal when the broadcast signal is received, identify a type of the received broadcast signal, and perform an audio quality improvement operation corresponding to the identified type to generate an improved audio signal, and play back the improved audio signal.

The control unit may control the display unit to display the audio quality setting state corresponding to the improved audio quality when the improved audio signal is being played back.

The broadcast signal further includes broadcast information including an EPG, and the type of the received broadcast signal may be identified using a schedule of broadcast channels contained in the EPG.

According to an aspect of another exemplary embodiment, there is provided an audio processing method of a television (TV), the method including determining if an event for checking an audio quality of the audio signal has occurred, playing back a first audio file having a non-improved audio quality if the event has occurred, performing an audio quality improvement operation for the first audio file to generate a second audio file having an improved audio quality, playing back the second audio file, and displaying the audio quality setting state corresponding to the improved audio quality when the second audio file is being played back.

The first audio file may be pre-stored in the TV.

According to an aspect of another exemplary embodiment, there is provided a method of processing a non-modified audio signal of a television including receiving the non-modified audio signal; receiving an input signal to check an audio quality; generating an improved audio signal based on the non-modified signal by setting a respective state of each of a plurality of variables; playing the improved audio signal; and displaying on the display the respective states of the plurality of variables during the outputting of the improved audio signal.

The input signal may be a user input.

The input signal may be received in response to the receiving of the incoming audio signal.

The input signal may be received in response to a preset period of time elapsing.

The non-modified audio signal may be pre-stored in a storage unit.

The method may further include playing the non-modified audio signal at least one of before and after the playing of the improved audio signal, and the respective states of the plurality of the variables is not displayed during the playing of the non-modified audio signal.

BRIEF DESCRIPTION OF THE DRAWINGS

The above and/or other aspects will be more apparent by describing certain exemplary embodiments with reference to the accompanying drawings, in which.

DETAILED DESCRIPTION OF EXEMPLARY EMBODIMENTS

Figure 1:
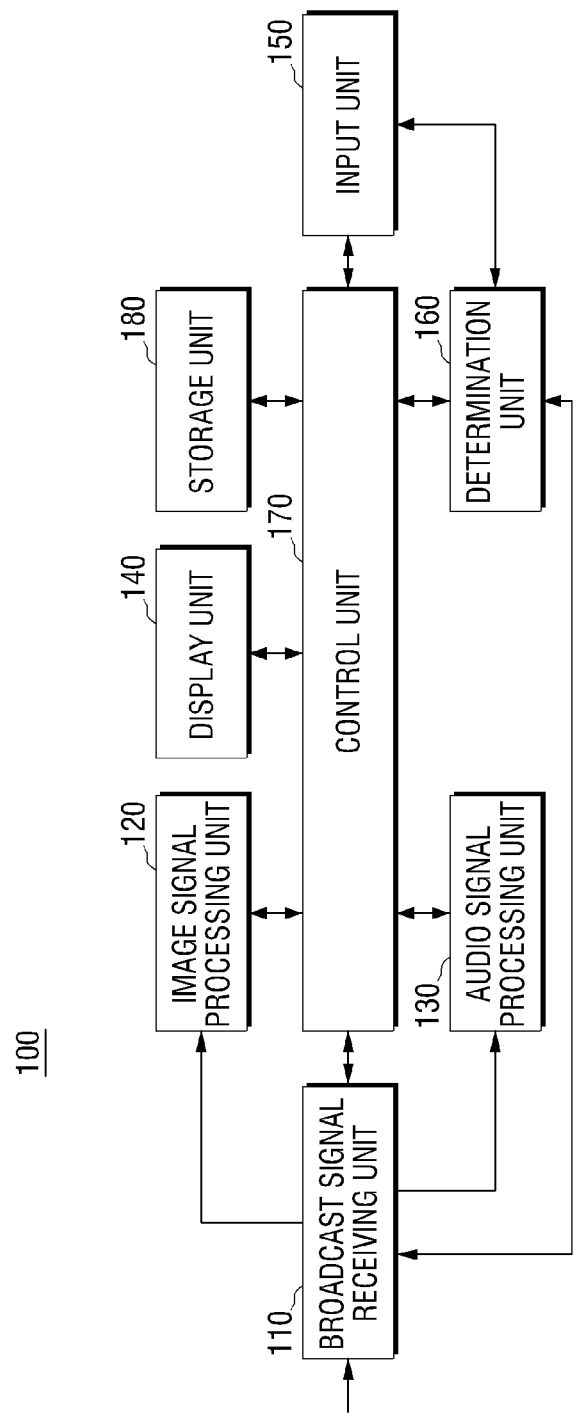
FIG. 1 is a block diagram of a TV according to an exemplary embodiment.

Certain exemplary embodiments will now be described in greater detail with reference to the accompanying drawings.

In the following description, like drawing reference numerals are used for like elements, even in different drawings. The matters defined in the description, such as detailed construction and elements, are provided to assist in a comprehensive understanding of the inventive concept. However, the exemplary embodiments can be practiced without those specifically defined matters. Also, well-known functions or constructions are not described in detail since they would obscure the invention with unnecessary detail.

FIG. 1 is a block diagram of a TV according to an exemplary embodiment. Referring to FIG. 1, the TV 100 may include a broadcast signal receiving unit 110, an image signal processing unit 120, an audio signal processing unit 130, a display unit 140, an input unit 150, a determination unit 160, a control unit 170, and a storage unit 180.

The broadcast signal receiving unit 110 receives a broadcast signal including an audio signal, an image signal, and broadcast information. The broadcast signal receiving unit 110 divides a broadcast signal received from a transmitter, e.g., a broadcasting station, into a non-modified, received audio signal, an image signal, and broadcast information. The broadcast signal received by the broadcast signal receiving unit 110 may be a signal which has been already processed by a set-top box (not shown).

The image signal processing unit 120 processes the image signal through operations such as tuning, demodulation, equalization, and forward error correction (FEC).

The audio signal processing unit 130 processes the audio signal, and may include an audio processor (not shown), an amplifier (not shown), and at least one speaker (not shown). The audio processor processes the audio signal, the amplifier amplifies the processed audio signal, and the speaker reproduces and outputs the amplified audio signal. Alternatively, the audio signal processing unit 130 may include only the audio processor and the amplifier. The speaker, such as a general speaker and a woofer speaker, may be provided separately from the audio signal processing unit 130.

The audio signal processing unit 130 processes the audio signal of the received broadcast signal as described above. Alternatively, if an audio signal of a received broadcast signal is converted into an audio file and is stored in the storage unit 180, the audio signal processing unit 130 processes the audio file as described above. The audio file may be an audio file which has been received from an external device (not shown) and has been previously stored in the storage unit 180.

The display unit 140 displays an audio quality setting state.

More specifically, if the audio signal processing unit 130 plays back the audio signal of the broadcast signal and subsequently plays back the audio signal having improved audio quality, the display unit 140 displays an audio quality setting state after the audio quality is improved while the audio signal having improved audio quality is being played back.

In addition, the display unit 140 may display an audio quality setting state before the audio quality is improved while the audio signal without the improved audio quality is being played back, and may display an audio quality setting state after the audio quality is improved while the audio signal having improved audio quality is being played back.

Improving audio quality indicates that among setting items for changing audio quality, a specific setting item is changed, or indicates that audio quality optimized according to a kind of a received broadcast signal is set.

An audio quality setting state indicates a state of one or more of a number of different setting items, or variables, that affect audio quality.

The input unit 150 receives a user command. The input unit 150 may receive a user command through an on-screen display (OSD) of the TV 100 or through the display unit 140 which is implemented as a touch screen.

The determination unit 160 determines if an event for checking audio quality has occurred. An event for checking audio quality may be one of a lapse of a preset period of time, input of a user command, and reception of a broadcast signal.

The control unit 170 controls the overall operation of the TV 100. More specifically, if an event for checking audio quality occurs, the control unit 170 controls the display unit 140 to display an audio quality setting state after the audio quality is improved.

The control unit 170 may perform the operation of the determination unit 160.

The storage unit 180 stores information, for example, information regarding an event for checking audio quality, information regarding an audio quality setting state set differently according to the kind of a broadcast signal, information regarding an audio quality setting state set differently according to designation of a user, an audio signal before and after audio quality is improved, and information regarding an received electronic program guide (EPG).

In addition, if a received audio signal is converted into an audio file, the storage unit 180 stores the audio file. The storage unit 180 may store a sample music file as an audio file. The audio file may have a number of different file formats. The audio signal processing unit 130 can play back files of different formats to be output as audio, such as, for example, a movie file.

Figure 2:
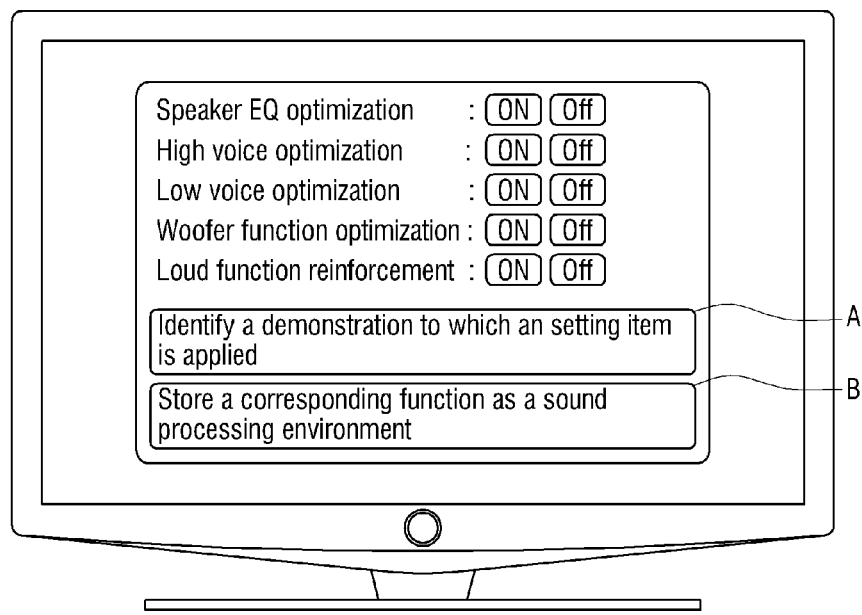
FIG. 2 illustrates an exemplary embodiment of a display unit which is displaying an audio quality setting state.

FIG. 2 illustrates an exemplary embodiment of the display unit 140 which is displaying an audio quality setting state. Referring to FIG. 2, the audio quality setting state is displayed, including a number of different setting items such as speaker EQ optimization, high voice optimization, low voice optimization, woofer function optimization, and loud function reinforcement.

In the audio signal processing unit 130, speaker EQ optimization is performed by adjusting an operational relationship between the audio processor, the amplifier and the speaker.

In FIG. 2, if button A is selected, a sample music file to which some of the setting items are applied is stored to perform a demonstration, and if button B is selected, a corresponding function is stored as a sound processing environment.

Accordingly, the display unit 140 displays the audio quality setting state after audio quality is improved, so consumers can visually identify improved audio quality, and thus can more easily evaluate audio quality.

Hereinafter, alternative exemplary embodiments of TV are described with reference to FIG. 2.

The TV 100 according to an exemplary embodiment can demonstrate the states before and after audio quality improvement.

In the TV 100, an event such as a lapse of a preset period of time or reception of a user command to check audio quality may occur.

If the determination unit 160 determines that an event occurs, the audio signal processing unit 130 plays back a received, non-modified audio signal and an improved audio signal processed to have improved audio quality in sequence, and displays an audio quality setting state showing improved audio quality when the processed audio signal is being played back according to the operation of the control unit 170.

In this case, the audio signal processing unit 130 may repeatedly play back the received audio signal and the processed audio signal. For example, if the broadcast receiving unit 110 receives an audio signal of "Cannon variation," the audio signal processing unit 130 repeatedly plays back the received "Cannon variation" and the improved "Cannon variation" processed to have improved audio quality.

In addition, the audio signal processing unit 130 may repeatedly play back a plurality of different music files a number of times that is preset for each respective music file. For example, with the different received audio signals "Heal the world," "Under the sea" and "That's why," the audio signal processing unit 130 may play back received "Heal the world" and improved "Heal the world" processed to have improved audio quality, one time, and may play back received "Under the sea" and improved "Under the sea" processed to have improved audio quality, two times. When the audio signal processing unit 130 plays back an audio signal processed to have improved audio quality, the display unit 140 may play back an audio quality setting state showing the improved audio quality.

The audio signal processing unit 130 repeatedly plays back the audio signals, so consumers can visually recognize the improved audio quality more easily.

The TV 100 according to another exemplary embodiment can display audio quality setting states of before and after audio quality is improved if an event to check audio quality, such as a user command, is input.

If a user inputs a command to check an audio quality setting state using a particular key on a remote control of the TV 100, the determination unit 160 determines that an event to check audio quality of the TV 100 has occurred.

The display unit 140 can display a UI inquiring whether to identify audio quality. For example, a UI displayed by the display unit 140 may be implemented as a pop-up window or an OSD.

The audio signal processing unit 130 plays back a sample music file having non-improved audio quality in response to the event.

Subsequently, the audio signal processing unit 130 performs audio quality improvement by changing setting values of a number of different setting items that affect audio quality of a received audio signal as illustrated in the exemplary embodiment of FIG. 2, and plays back the audio signal having improved audio quality.

The audio signal processing unit 130 plays back the non-improved audio signal and the improved audio signal in sequence. In addition, when the audio signal processing unit 130 plays back the improved audio signal, the display unit 140 displays the audio quality setting state showing improved audio quality.

Therefore, the user can auditorily identify audio quality improvement by listening to the non-improved audio signal and the improved audio signal, and can visually identify audio quality improvement by watching respective audio quality setting states representing before audio quality improvement and after audio quality improvement. As a result, consumers can more easily evaluate audio quality for selecting a TV.

The display unit 140 can display a UI inquiring whether to change the audio quality setting state after audio quality is improved. Accordingly, the storage unit 180 can store an audio signal reflecting the audio quality setting state after audio quality is improved according to the user's preference.

The TV 100 according to another exemplary embodiment can display audio quality setting states that respectively represent before and after audio quality is improved based on the type of a received broadcast signal.

If the broadcast signal receiving unit 110 receives a broadcast signal, the determination unit 160 determines that an event occurs.

The audio signal processing unit 130 plays back a music file having non-improved audio quality and identifies the type of the received broadcast signal.

The type of the broadcast signal received by the broadcast signal receiving unit 110 can be identified using information relating a schedule of broadcast channels contained in an EPG. The type of the broadcast signal may include news, sport, action movie, etc.

Subsequently, the audio signal processing unit 130 performs an audio quality improvement operation corresponding to the identified type of the broadcast signal. For example, if the type of the broadcast signal is an action movie, the audio signal processing unit 130 switches on low voice optimization and woofer function optimization as illustrated in FIG. 2, and plays back a music file having improved audio quality.

When the audio signal processing unit 130 plays back the audio signal having improved audio quality, the display unit 140 displays an audio quality setting state showing that low voice optimization and woofer function optimization are switched on.

Subsequently, the storage unit 180 stores the corresponding function as a sound processing environment. Accordingly, if the broadcast signal receiving unit 110 receives a broadcast signal for an action movie and the TV 100 plays back the action movie later, the action movie for which audio quality improvement has been performed, by switching on low voice optimization and woofer function optimization, can be played.

In the TV 100 according to another exemplary embodiment, the audio signal processing unit 130 can sequentially play back an audio signal to which setting items such as speaker EQ optimization, high voice optimization, low voice optimization, woofer function optimization, and loud function reinforcement are applied, and the display unit 140 can display an audio quality setting state when the audio signal is being sequentially played back.

Figure 3:
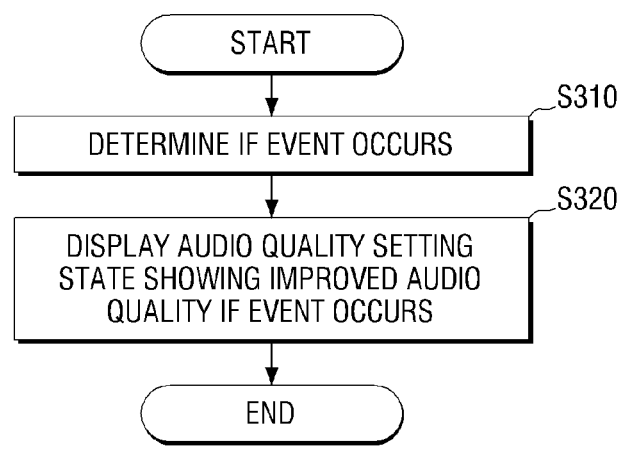
FIG. 3 is a flow chart illustrating an audio processing method of a TV according to an exemplary embodiment.

FIG. 3 is a flow chart illustrating an audio processing method of the TV 100 according to an exemplary embodiment. Referring to FIG. 3, the determination unit 160 determines if an event for checking audio quality has occurred (S310).

If the determination unit 160 determines that an event for checking audio quality has occurred, the display unit 140 displays an audio quality setting state showing improved audio quality (S320).

In addition, the audio signal processing unit 130 may play back an audio signal having improved audio quality, and the display unit 140 may display an audio quality setting state after the audio quality is improved.

In addition, the audio signal processing unit 130 may repeatedly play back a music file having a non-improved audio quality and an audio signal having an improved audio quality a preset number of times. A plurality of different music files can be repeatedly played back a respective number of times that is preset for each music file.

Figure 4:
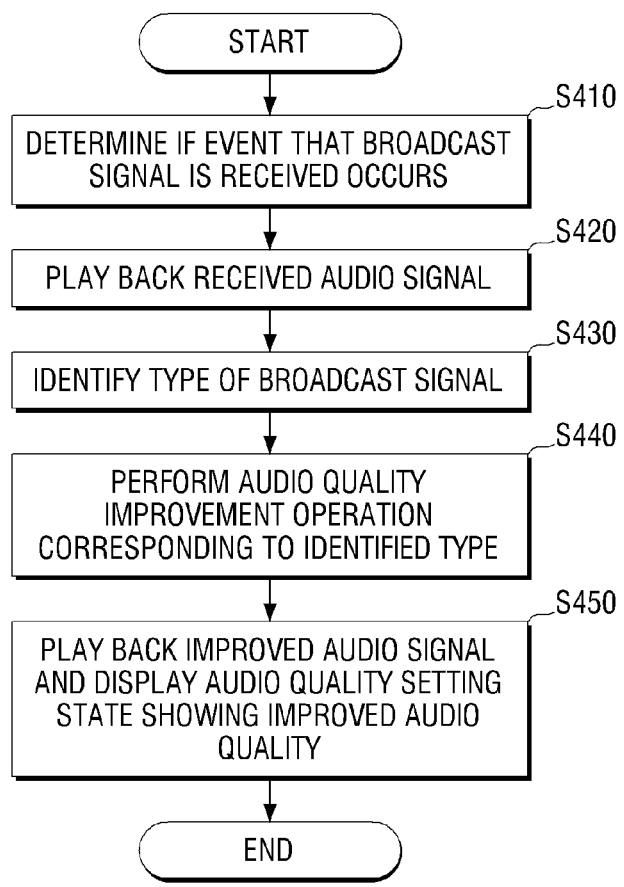
FIG. 4 is a flow chart illustrating an audio processing method of a TV according to another exemplary embodiment.

FIG. 4 is a flow chart illustrating an audio processing method of the TV 100 according to another exemplary embodiment. Referring to FIG. 4, the determination unit 160 determines if an event occurs, wherein the event is a broadcast signal being received (S410).

If the determination unit 160 determines that a broadcast signal has been received, a received audio signal is played back (S420).

Subsequently, the audio signal processing unit 130 identifies the type of the broadcast signal (S430), and performs an audio quality improvement operation corresponding to the identified type (S440).

The audio signal processing unit 130 plays back the improved audio signal and the display unit 140 displays an audio quality setting state showing improved audio quality (S450).

Accordingly, the display unit 140 displays the audio quality setting state after audio quality is improved, so consumers can visually identify improved audio quality. In addition, the audio quality improvement operation corresponds to the type of the received broadcast signal so that audio quality improvement is performed differently according to the type of the broadcast signal, thereby enhancing user convenience.

Figure 5:
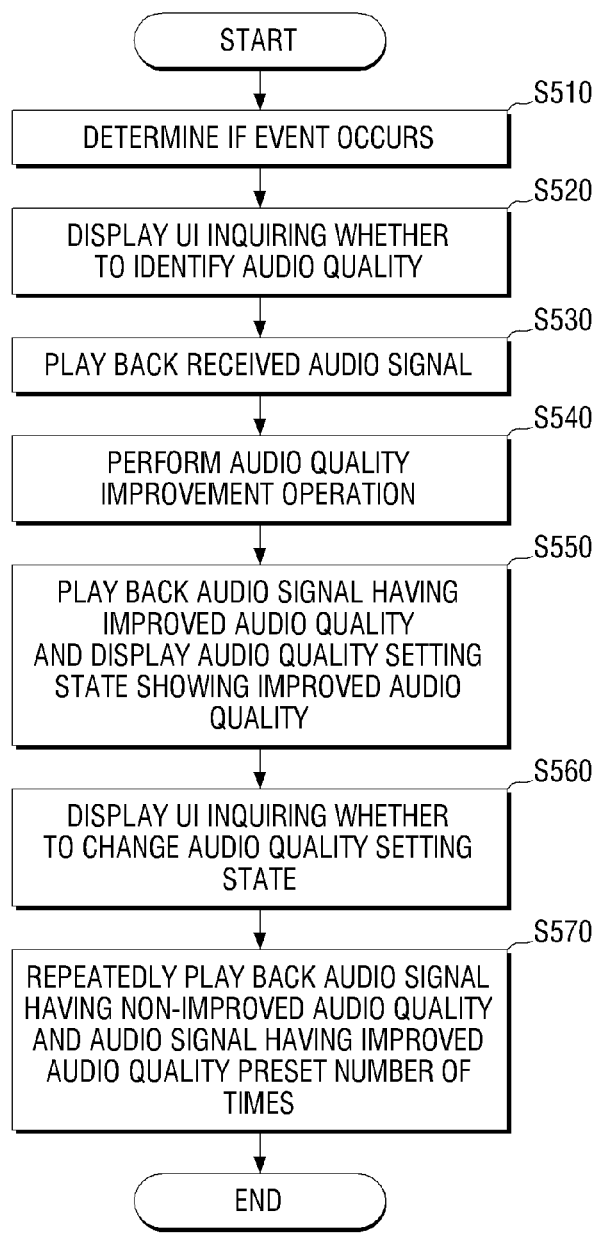
FIG. 5 is a flow chart illustrating an audio processing method of a TV according to another exemplary embodiment.

FIG. 5 is a flow chart illustrating an audio processing method of the TV 100 according to another exemplary embodiment. Referring to FIG. 5, the determination unit 160 determines if an event for checking audio quality has occurred (S510), and the display unit 140 displays a UI inquiring whether to identify audio quality (S520).

If a user command to identify audio quality is input, the audio signal processing unit 130 plays back an audio signal having non-improved audio quality, that is, the received audio signal (S530) and performs audio quality improvement operation (S540).

Subsequently, the audio signal processing unit 130 plays back an audio signal having improved audio quality, and the display unit 140 displays an audio quality setting state showing improved audio quality (S550).

The display unit 140 displays a UI inquiring whether to change the audio quality setting state (S560).

The audio signal processing unit 130 repeatedly plays back the audio signal having non-improved audio quality and the audio signal having improved audio quality the preset number of times (S570).

In this case, operation S530 may be performed after operation S570.

Figure 6:
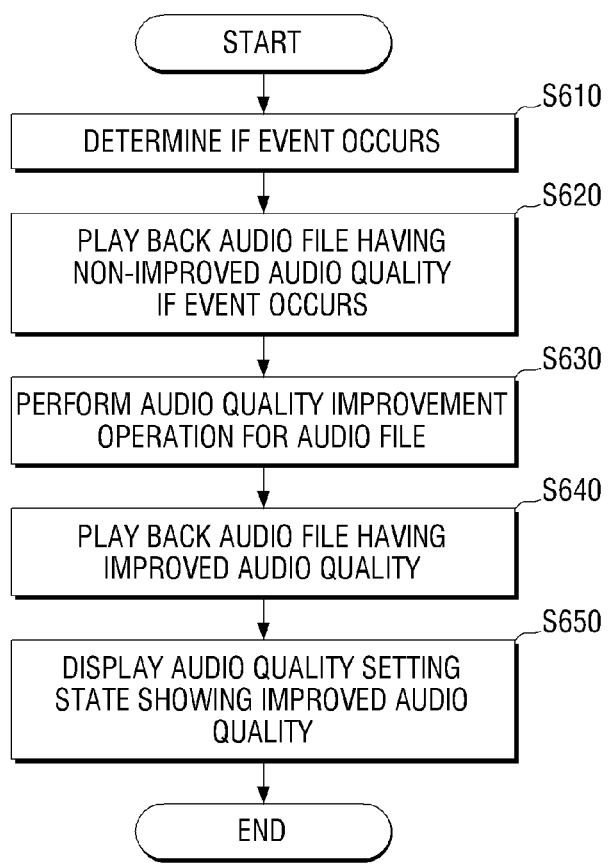
FIG. 6 is a flow chart illustrating an audio processing method of a TV according to another exemplary embodiment.

FIG. 6 is a flow chart illustrating an audio processing method of the TV 100 according to another exemplary embodiment. Referring to FIG. 6, the determination unit 160 determines if an event for checking audio quality has occurred (S610), and if an event for checking audio quality has occurred, the audio signal processing unit 130 plays back an audio file having non-improved audio quality (S620).

Subsequently, the audio signal processing unit 130 performs an audio quality improvement operation for the audio file (S630) and plays back the audio file having the improved audio quality (S640).

The display unit 140 displays an audio quality setting state showing improved audio quality (S650).

The audio file having non-improved image quality and the audio file having improved image quality may be sample files pre-stored in the TV 100, including audio files having an extension such as WAV, MP3, etc, or audio files contained in movie files.

Detailed description of overlapping portions is not repeated.

The foregoing exemplary embodiments are merely exemplary and are not to be construed as limiting. The present inventive concept can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An audio processing method of a television (TV) which receives a broadcast signal comprising a received audio signal, the audio processing method comprising:

determining if an event for an audio quality test has occurred;

playing back the received audio signal of the broadcast signal after the event has occurred;

displaying a first audio quality setting state corresponding to an audio quality of the received audio signal while the received audio signal is being played back;

performing an audio quality improvement operation for the received audio signal to generate an automatically improved audio signal having the improved audio quality;

playing back the improved audio signal, after playing back the received audio signal of the broadcast signal; and displaying a second audio quality setting state corresponding to the improved audio quality of the received audio signal while the improved audio signal is being played back if the event has occurred.

2. The audio processing method according to claim 1, further comprising:

repeatedly playing back the received audio signal and the improved audio signal a preset number of times.

3. The audio processing method according to claim 2, wherein the repeatedly playing back comprises repeatedly playing back a plurality of different received audio signals and respective improved audio signals each a respective number of times that is preset for each of the plurality of different received audio signals.

4. The audio processing method according to claim 1, further comprising:

displaying a user interface (UI) inquiring whether to change the second audio quality setting state showing the improved audio quality.

5. The audio processing method according to claim 1, wherein the event occurs when a preset period of time has elapsed or when a user command is input.

6. The audio processing method according to claim 1, further comprising:

displaying a user interface (UI) inquiring whether to check the audio quality of the received audio signal if the event has occurred.

7. The audio processing method according to claim 1, further comprising:

playing back the received audio signal of the received broadcast signal when the broadcast signal is received;

identifying a type of the received broadcast signal;

performing an audio quality improvement operation corresponding to the identified type to generate an improved audio signal having the improved audio quality; and playing back the improved audio signal.

8. The audio processing method according to claim 7, wherein the second audio quality setting state corresponding to the improved audio quality is displayed when the improved audio signal is being played back.

9. The audio processing method according to claim 7, wherein the broadcast signal further comprises broadcast information including an electronic program guide (EPG), and the type of the received broadcast signal is identified using a schedule of broadcast channels contained in the EPG.

10. A television (TV) which receives a broadcast signal comprising a received audio signal, the TV comprising:

an audio signal processing unit which processes the received audio signal of the received broadcast signal;

a display unit which displays a first audio quality setting state and a second audio quality setting state;

a determination unit which determines if an event for an audio quality test has occurred;

a control unit which controls the display unit to display the first audio quality setting state corresponding to an audio quality of the received audio signal while the received audio signal is being played back and the second audio quality setting state corresponding to an automatically improved audio quality after playing back the received audio signal of the broadcast signal, wherein the audio signal processing unit plays back the received audio signal of the received broadcast signal after the event has occurred, performs an audio quality improvement operation for the received audio signal to generate an improved audio signal having the improved audio quality, and plays back the improved audio signal while the audio signal having the improved audio quality is being played back.

11. The TV according to claim 10, wherein the audio signal processing unit repeatedly plays back the received audio signal and the improved audio signal a preset number of times.

12. The TV according to claim 11, wherein the audio signal processing unit repeatedly plays back each of a plurality of different received audio signals and respective improved audio signals a respective number of times that is preset for each of the plurality of different received audio signals.

13. The TV according to claim 10, wherein the display unit displays a user interface (UI) inquiring whether to change the second audio quality setting state showing the improved audio quality.

14. The TV according to claim 10, wherein the event occurs when a preset period of time has elapsed or when a user command is input.

15. The TV according to claim 10, wherein the display unit displays a user interface (UI) inquiring whether to check the audio quality of the received audio signal if the event has occurred.

16. The TV according to claim 10, wherein the audio signal processing unit plays back the received audio signal of the received broadcast signal when the broadcast signal is received, identifies a type of the received broadcast signal, and performs an audio quality improvement operation corresponding to the identified type to generate an improved audio signal, and plays back the improved audio signal.

17. The TV according to claim 16, wherein the control unit controls the display unit to display the second audio quality setting state corresponding to the improved audio quality when the improved audio signal is being played back.

18. The TV according to claim 16, wherein the broadcast signal further comprises broadcast information including an electronic program guide (EPG), and the type of the received broadcast signal is identified using a schedule of broadcast channels contained in the EPG.

19. An audio processing method of a television (TV) which receives a broadcast signal comprising an audio signal, the audio processing method comprising:

determining if an event for an audio quality test has occurred; and playing back a first audio file having a non-improved audio quality after the event has occurred;

displaying a first audio quality setting state corresponding to an audio quality of the first audio file while the first audio file is being played back performing an audio quality improvement operation for the first audio file to generate a second audio file having an automatically improved audio quality;

playing back the second audio file after playing back the first audio file; and displaying a second audio quality setting state corresponding to the improved audio quality while the second audio file is being played back.

20. The audio processing method according to claim 19, wherein the first audio file is pre-stored in the TV.

21. The audio processing method according to claim 19, wherein the event occurs when a preset period of time has elapsed or when a user command is input.

\* \* \* \* \*